United States Patent [19]

Mascia et al.

[11] 4,111,298
[45] Sep. 5, 1978

[54] REUSABLE CAN CARRIER STRIP

[75] Inventors: Carmen T. Mascia, Clarendon Hills; Gary K. Hasegawa, Chicago, both of Ill.

[73] Assignee: The Continental Group, Inc., New York, N.Y.

[21] Appl. No.: 825,242

[22] Filed: Aug. 16, 1977

[51] Int. Cl.² .................. B65D 71/00; B65D 85/62
[52] U.S. Cl. ................................. 206/151; 206/427; 294/87.2
[58] Field of Search ............... 206/159, 151, 150, 427, 206/430, 504, 821; 220/23.6, 23.8, 26.4; 294/87.2

[56] References Cited

U.S. PATENT DOCUMENTS

| 3,258,288 | 6/1966 | Courter | 206/151 |
| 3,331,500 | 7/1967 | Poupitch | 206/151 |
| 3,587,846 | 6/1971 | Heier | 206/151 |
| 3,669,258 | 6/1972 | Mascia | 206/151 |

Primary Examiner—William T. Dixson, Jr.
Attorney, Agent, or Firm—Charles E. Brown

[57] ABSTRACT

This relates to a reusable can carrier in the form of a molded plastics material strip having formed on the underside thereof a plurality of pairs of concentrically arranged arcuate flanges, each pair of flanges defining a socket receiving a cylindrical end portion of a can and interlocking beneath the customary seam securing the end unit to the body.

16 Claims, 7 Drawing Figures

U.S. Patent  Sept. 5, 1978  4,111,298
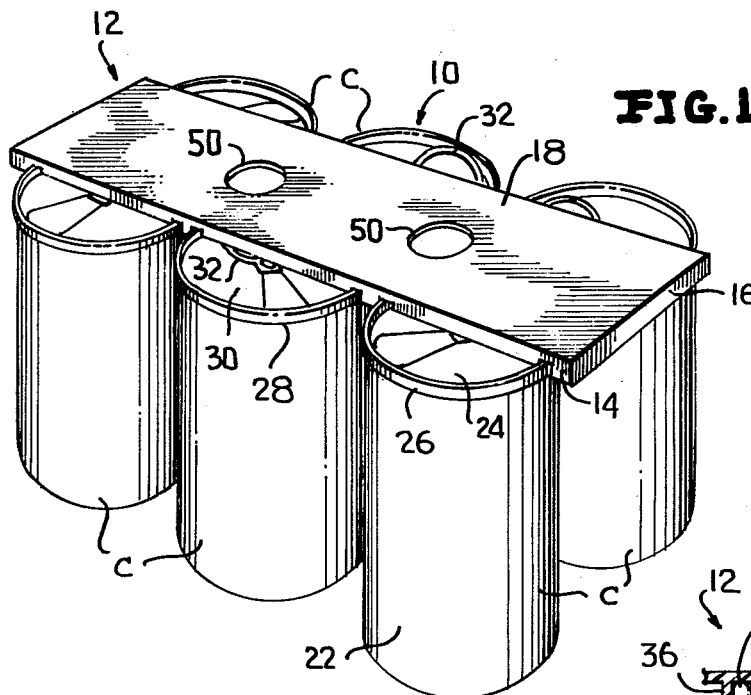
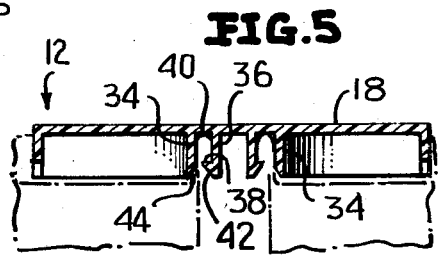
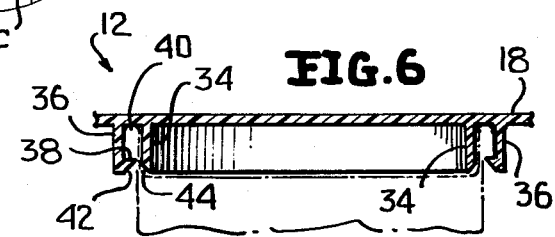
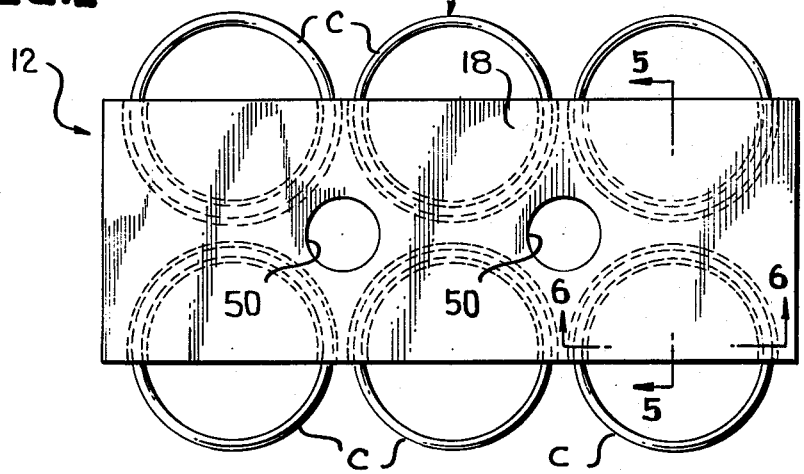
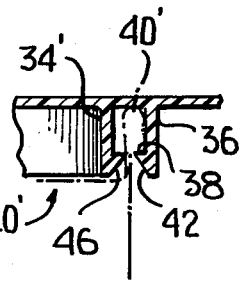
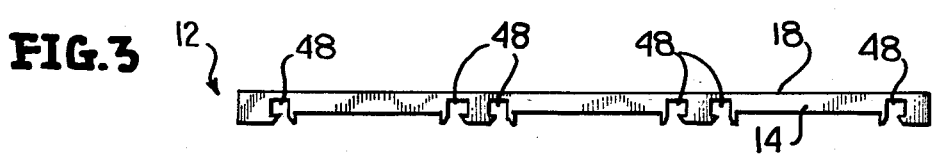
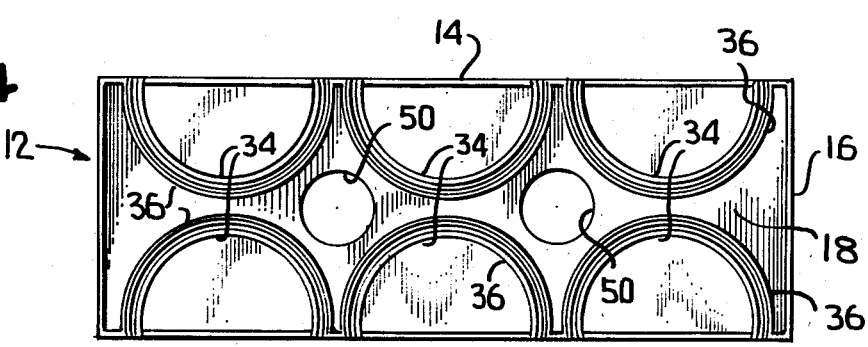

REUSABLE CAN CARRIER STRIP

This invention relates in general to new and useful improvements in container packages, and more particularly to a resuable can carrier.

At the present, beverage cans and the like are normally packaged in suitable packs of six and eight cans with the packages being designed solely for the purpose of conveying the cans to the ultimate user. When the cans are removed from the package, the carrier or wrapping is destroyed so that it no longer remains available for the return of the cans should it be so desired. At the present, it is proposed in certain areas to place a penalty or tax on the sale of cans so that it is desirable that the empty cans be returnable. Thus, it is proposed to provide a can carrier which is reusable not only for the return of the empty cans, but also for the sale of filled other cans and the return thereof.

In accordance with this invention there is provided a reusable carrier for cans in the form of an elongated strip which is preferably molded of plastics material and which has projecting downwardly therefrom a series of can retaining means. Each can retaining means is in the form of two concentrically arranged arcuate flanges which are spaced apart a distance to define a socket of a size to have tightly received therein a cylindrical end portion of a can including the customary seam securing the end unit of the can to a body thereof.

Most particularly, one of the two flanges is provided with a lip underlying the socket with the lip engaging beneath the can seam to retain the cylindrical portion of the can within the socket.

In order to facilitate entry of a can end portion into the socket, at least that flange carrying the lip has a frusto-conical surface engageable by a can to spread the flanges apart.

With the above and other objects in view that will hereinafter appear, the nature of the invention will be more clearly understood by reference to the following detailed description, the appended claims, and the several views illustrated in the accompanying drawings.

IN THE DRAWINGS:

FIG. 1 is a top perspective view of a can pack wherein a plurality of cans is secured together by a reusable can carrier to form a customary six-pack.

FIG. 2 is a top plan view of the can pack of FIG. 1.

FIG. 3 is a side elevational view of the can carrier of FIG. 1.

FIG. 4 is a bottom plan view of a can carrier.

FIG. 5 is an enlarged fragmentary transverse sectional view taken along the line 5—5 of FIG. 2 and shows the manner in which two transversely adjacent cans are interlocked with the can carrier.

FIG. 6 is an enlarged fragmentary longitudinal sectional view taken along the line 6—6 of FIG. 1, and shows more completely the interlocking of a can with a pair of flanges.

FIG. 7 is an enlarged fragmentary sectional view taken through the can carrier, and shows a modified flange construction.

Referring now to the drawings in detail, there is illustrated in FIG. 1 a can pack, generally identified by the numeral 10, which is formed of a can carrier, generally identified by the numeral 12, and a plurality of conventional cans C. In the illustrated form of the invention the can pack is a six-pack and there are six cans. However, it is to be readily apparent that a larger or smaller number of cans can be accommodated by modifying the can carrier.

The can carrier 12 is in the form of an elongated strip which is reinforced along its side edges by side flanges 14 and its end edges by end flanges 16. Projecting downwardly from the underside of the strip, which is identified by the numeral 18, is a plurality of pairs of concentric flanges, each pair of flanges defining a can retaining means, generally identified by the numeral 20. The arrangement of the can retaining means is best shown in FIG. 4.

At this time it is pointed out that a conventional can C includes a can body 22 having at least one end thereof closed by an end unit 24 which is secured to the can body 22 by a seam 26. The seam 26 is normally a double seam and projects radially outwardly beyond adjacent portions of the can body. The end unit 24 is primarily recessed with respect to the seam 26 so that the can C has a generally cylindrical end portion 28 which projects axially beyond an end panel 30 thereof. The illustrated end units 24 are of the easy opening type and are shown to carry pull tabs 32.

At this time it is pointed out that each can retaining means 20 is intended to receive and interlock with the cylindrical end portion 28. Accordingly, each can retaining means is in the form of two concentrically arranged arcuate flange segments 34, 36 with the flange segment 34 being the smaller diameter flange segment and the flange segment 36 being the larger flange segment. The flange segments 34, 36 are spaced apart a distance to tightly receive therein the cylindrical end portion 28. The flange segment 36 carries a lip 38 which underlies the seam 26 and serves to retain the can cylindrical portion 28 within the socket 40 defined between the flange segments 34, 36.

In order to facilitate entry of a can cylindrical portion 28 into the socket 40, the flange segment 36 and the lip 38 carried thereby have a frusto-conical surface 42 which opens generally out of the socket 40 and generally toward the flange segment 34. The flange segment 34 may also have a frusto-conical surface 44 which opens out of the socket 40. The surfaces 42, 44 are engageable with a can end portion 28 and facilitate the automatic spreading apart of the flange segments 34, 36 when the can carrier 12 is pressed down onto a can.

Reference is now made to FIG. 7 wherein there is illustrated a slightly modified form of can retaining means identified by the numeral 20'. The can retaining means 20' includes a flange segment 34' and a flange segment 36' which are spaced apart to define a socket 40'. The flange segment 34' differs from the flange segment 34 in that it is also provided with a lip 46 which corresponds to the lip 38.

It will be seen that the flange segments 34, 36 terminate at the side flanges 14 and thus the side flanges 14 have openings 48 therethrough corresponding to opposite ends of each socket 40. Each side flange 14 is relieved along a lower edge between each pair of openings 48 to provide clearance for the end structure of an associated can C. Most particularly, it is to be understood that if the can C is internally pressurized the end panel 30 will upwardly bulge. Further, if the end unit 24 is of the easy opening type, clearance must be provided for the pull tab 32.

At this time it is pointed out that the arcuate extent of the flanges 34, 36 should be on the order of 180° to 210°. If the arcuate extent is materially less than 180°, insufficient gripping of the can will occur. An arcuate extent in excess of 210° normally will result in the can carrier 12 being of a greater than required bulk.

In order to facilitate handling of the can pack 10, the strip 18 is provided with conveniently located finger openings 15. The can pack 10 may be carried in the customary manner by engagement of the can carrier 12 through the opening 50.

At this time it is pointed out that the can carrier 12 is preferably formed of plastics material having sufficient resilience to permit the required deflection of the flange segments 34, 36. Preferably the can carrier 12 is formed by an injection molding process.

It is to be understood that the can carrier is to be utilized initially as a packaging element for the sale of a prescribed number of cans as a unit. After a can has been removed from the can carrier 12, and the contents thereof dispensed, the empty can may be replaced by snapping it back into the socket 40. Thus when the cans have all been emptied, they may be returned together with the can carrier 12 as a unit for the prescribed refund.

It is to be understood that the can carrier 12 is intended to have a long lasting life and thus may be used over and over again for both the selling and returning of cans.

Although only a preferred embodiment of the can carrier has been illustrated and described herein, it is to be understood that minor variations may be made in the can carrier without departing from the spirit and scope of the invention.

What is claimed as new is:

1. A new article of manufacture comprising a reusable can carrier, said can carrier being in the form of an elongated strip having formed on one surface thereof a series of can retaining means, each can retaining means being in the form of two concentrically arranged arcuate flange segments projecting from said surface of said strip, said two flanges being spaced apart a distance to define a socket of a size to have tightly received therein a cylindrical end portion of a can including the customary seam securing an end unit of the can to a body thereof, said strip having reinforcing flanges depending therefrom along sides thereof and each of said sockets opening through one of said sides at two spaced locations.

2. The article of claim 1 wherein the larger diameter one of said flanges has remote from said strip a retaining lip projecting radially toward the other of said two flanges for underlying a seam of an associated can and forming an interlock therewith.

3. The article of claim 2 wherein said lip and said larger diameter flange have a generally frusto-conical surface generally facing out of said socket and toward the other of said flanges for facilitating the automatic deflection of said larger diameter flange to permit passage of a can end portion into said socket.

4. The article of claim 3 wherein said other flange also has a frusto-conical surface generally facing out of said socket.

5. The article of claim 4 wherein said other flange also has a retaining lip projecting radially toward said large diameter flange.

6. The article of claim 1 wherein said reinforcing flanges are relieved between socket openings of each can retaining means for providing clearance for a can end panel and any element that may be carried thereby.

7. The article of claim 1 wherein said strip and said can retaining means are integrally molded of plastics material.

8. The article of claim 1 wherein the arcuate extent of said socket is on the order of 180°.

9. The article of claim 1 wherein the arcuate extent of said socket is on the order of 180° to 210°.

10. A can package comprising a plurality of cans each having an end panel secured to a body by a radially outwardly projecting seam and including a generally cylindrical end portion, and a reusable can carrier interlocked with said can end portions, said can carrier being in the form of a strip having projecting from one surface thereof a can retaining means for each can, each can retaining means being in the form of two concentrically arranged arcuate flange segments, said flange segments being spaced apart to define a socket tightly receiving a respective can cylindrical end portion, said strip having reinforcing flanges depending therefrom along sides thereof, and each of said sockets opening through one of said sides at two spaced locations.

11. The package of claim 10 wherein the larger diameter one of said flanges has a retaining lip underlying said seam and retaining said can cylindrical end portion in said socket.

12. The can package of claim 11 wherein said lip and said larger diameter flange have a generally frusto-conical surface generally facing out of said socket for facilitating entry of said can cylindrical portion into said socket and said other flange also has a frust-conical surface generally facing out of said socket for facilitating entry of said can cylindrical portion into said socket.

13. A new article of manufacture comprising a reusable can carrier, said can carrier being in the form of an elongated strip having formed on one surface thereof a series of can retaining means, each can retaining means being in the form of two concentrically arranged arcuate flange segments projecting from said surface of said strip, said two flanges being spaced apart a distance to define a socket of a size to have tightly received therein a cylindrical end portion of a can including the customary seam securing an end unit of the can to a body thereof, the larger diameter one of said flanges having remote from said strip a retaining lip projecting radially toward the other of said two flanges for underlying a seam of an associated can and forming an interlock therewith, and said other flange each having a generally frusto-conical surface generally facing out of said socket and toward a respective opposing flange for facilitating the automatic deflection of said flanges to permit passage of a can end portion into said socket.

14. The article of claim 13 wherein said larger diameter flange also ahs a generally frusto-conical surface generally facing out of said socket and toward said other flange.

15. The article of claim 13 wherein said other flange also has a retaining lip porjecting radially toward said large diameter flange.

16. The article of claim 13 wherein said strip has reinforcing flanges depending therefrom along sides thereof, and each of said sockets opens through one of said sides at two spaced locations.

* * * * *